United States Patent
Acosta

(10) Patent No.: US 10,943,031 B2
(45) Date of Patent: Mar. 9, 2021

(54) ADAPTIVE DATA SANITATION SYSTEM FOR ENDPOINTS

(71) Applicant: Citrix Systems, Inc., Fort Lauderdale, FL (US)

(72) Inventor: Rodney Gallart Acosta, Plantation, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 222 days.

(21) Appl. No.: 15/851,881

(22) Filed: Dec. 22, 2017

(65) Prior Publication Data
US 2019/0197258 A1  Jun. 27, 2019

(51) Int. Cl.
| | |
|---|---|
| H04L 29/06 | (2006.01) |
| G06F 21/64 | (2013.01) |
| G06F 21/57 | (2013.01) |
| G06F 21/55 | (2013.01) |
| G06F 16/25 | (2019.01) |
| G06F 21/60 | (2013.01) |
| G06F 21/62 | (2013.01) |
| G06F 16/245 | (2019.01) |

(52) U.S. Cl.
CPC .............. *G06F 21/64* (2013.01); *G06F 16/25* (2019.01); *G06F 21/55* (2013.01); *G06F 21/577* (2013.01); *G06F 21/602* (2013.01); *G06F 21/6245* (2013.01); *G06F 16/245* (2019.01); *G06F 2221/034* (2013.01); *G06F 2221/2143* (2013.01)

(58) Field of Classification Search
CPC ...................................................... G06F 21/64
See application file for complete search history.

(56) References Cited

U.S. PATENT DOCUMENTS

| | | | | |
|---|---|---|---|---|
| 10,203,968 | B1* | 2/2019 | Lawson | G06F 9/44521 |
| 2003/0009690 | A1* | 1/2003 | Grupe | H04L 47/10 |
| | | | | 726/4 |
| 2004/0215972 | A1* | 10/2004 | Sung | H04L 63/1408 |
| | | | | 726/23 |
| 2006/0182133 | A1* | 8/2006 | Choumaru | H04L 45/745 |
| | | | | 370/401 |
| 2007/0234337 | A1* | 10/2007 | Suzuki | G06F 9/45558 |
| | | | | 717/168 |
| 2007/0300306 | A1* | 12/2007 | Hussain | G06F 21/6227 |
| | | | | 726/27 |

(Continued)

OTHER PUBLICATIONS

Weinberger J, "Systematic Analysis of XSS Sanitization in Web Application Frameworks", 2011, European Symposium on Research in Computer Security (Year: 2011).*

*Primary Examiner* — Taghi T Arani
*Assistant Examiner* — Lin Chang
(74) *Attorney, Agent, or Firm* — Banner & Witcoff, Ltd.

(57) ABSTRACT

Methods and systems for adaptively sanitizing data for endpoints are described herein. A system may contain one or more endpoints that receive requests for data and provide responses to the requests. A sanitizer may adaptively sanitize each request and response according to a sanitation level provided by a log analyzer. The sanitation level may be based on a risk level of attack at the endpoint as determined by the log analyzer. The log analyzer may analyze logs containing all operations performed at the endpoint to determine a sanitation level. Thus, the amount of sanitation performed by the sanitizer can be tailored to the needs of any given endpoint.

27 Claims, 6 Drawing Sheets

(56) References Cited

U.S. PATENT DOCUMENTS

| | | | | |
|---|---|---|---|---|
| 2009/0055477 | A1* | 2/2009 | Flesher | G06F 16/176 709/204 |
| 2011/0072489 | A1* | 3/2011 | Parann-Nissany | H04L 65/605 726/1 |
| 2011/0283115 | A1* | 11/2011 | Junod | H04L 9/0631 713/190 |
| 2013/0259228 | A1* | 10/2013 | Ren | H04L 63/123 380/200 |
| 2014/0156990 | A1* | 6/2014 | Dare | H04L 63/0823 713/156 |
| 2014/0325239 | A1* | 10/2014 | Ghose | G06F 9/3851 713/190 |
| 2015/0186645 | A1* | 7/2015 | Aziz | H04L 63/1433 726/23 |
| 2015/0207706 | A1* | 7/2015 | Li | H04L 67/02 709/224 |
| 2015/0373040 | A1* | 12/2015 | Sander | H04L 63/1425 726/22 |
| 2016/0191466 | A1* | 6/2016 | Pernicha | H04L 63/20 726/1 |
| 2017/0046211 | A1* | 2/2017 | Jayawardena | G06F 9/45512 |
| 2017/0098215 | A1* | 4/2017 | Brotsky | G06Q 50/265 |
| 2018/0069772 | A1* | 3/2018 | Nowack | H04L 43/065 |
| 2018/0210817 | A1* | 7/2018 | Kelly | G06F 16/2455 |

* cited by examiner

ADAPTIVE DATA SANITATION SYSTEM FOR ENDPOINTS

FIELD

Aspects described herein generally relate to computers, networking, hardware, and software. More specifically, one or more aspects of the disclosure relate to adaptively sanitizing endpoints.

BACKGROUND

Servers may contain many endpoints that provide services to clients such as RESTful services. Clients may make requests to endpoints to receive data and the endpoint may retrieve the data and send it back to the client. Some requests, however, may be made in an effort to attack the server and may contain data that needs to be sanitized to prevent a security risk. Further, the endpoint's response to a request may need to be sanitized because the endpoint may have inadvertently stored malicious code or data in its database. To prevent an attack on the server, the data fields in a request may be sanitized by identifying and removing malicious data. However, sanitation of the data requests and responses may require a great deal of resources and may slow down the server when there is a high volume of requests because every request may need to be inspected or sanitized. In addition, each endpoint may require different types of sanitation or different data fields to be checked for malicious data. Maintaining code for sanitizing requests and responses for each endpoint can be cumbersome. Therefore, a system that addresses these issues may be desired.

SUMMARY

The following presents a simplified summary of various aspects described herein. This summary is not an extensive overview, and is not intended to identify required or critical elements or to delineate the scope of the claims. The following summary presents some concepts in a simplified form as an introduction to the more detailed description provided below.

A system may determine a number of endpoints and data fields associated with the endpoints that require sanitation. When a request for data is made from a client device to an endpoint, the system may act as an intermediary and receive or intercept the request. The system may receive a sanitation level for the request from a log analyzer. The sanitation level may indicate how in-depth the sanitation may be for the request. The system may sanitize the data fields in the request according to the request sanitation level received. The system may send the sanitized request to its corresponding endpoint. The system may receive or intercept the endpoint's response to the sanitized request. The system may receive a sanitation level for the response from a log analyzer and may sanitize the response according to the response sanitation level. The system may send the sanitized response to the client device that made the original request.

To overcome the issues described above, and to overcome other limitations that will be apparent upon reading and understanding the present specification, aspects described herein are directed towards systems, methods, and techniques for adaptive data sanitation of endpoints.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards adaptive data sanitation of endpoints. A system may contain one or more endpoints that receive requests for data and provide responses to the requests. A sanitizer may adaptively sanitize each request and response, according to a sanitation level provided by a log analyzer, before a request is received by the endpoint and before a response is sent to a client device. The sanitation level may be based on a risk level of attack at the endpoint as determined by the log analyzer. The log analyzer may analyze logs containing all operations performed at the endpoint to determine a sanitation level. Thus, the amount of sanitation performed by the sanitizer can be tailored to the needs of any given endpoint.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
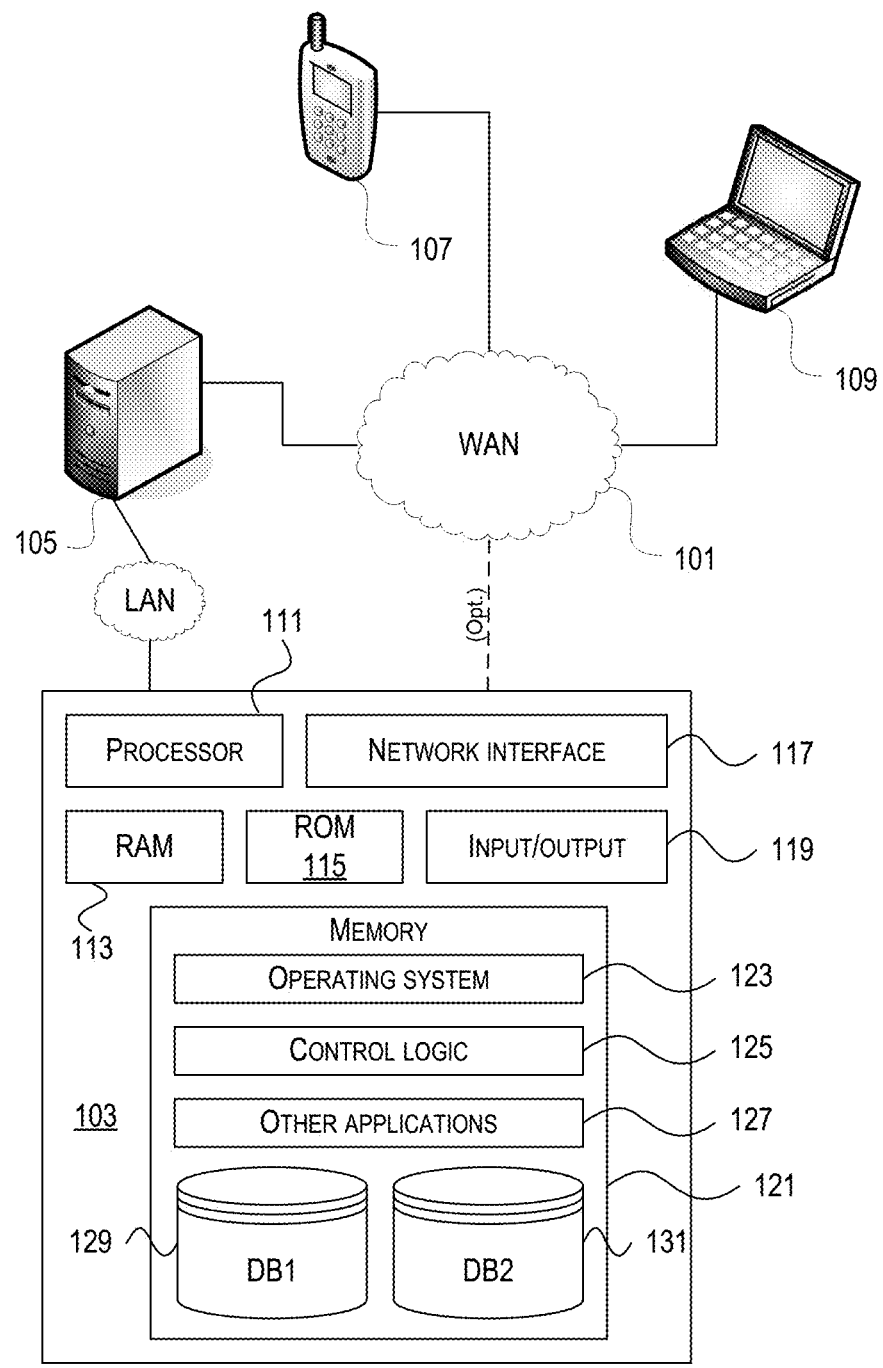
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
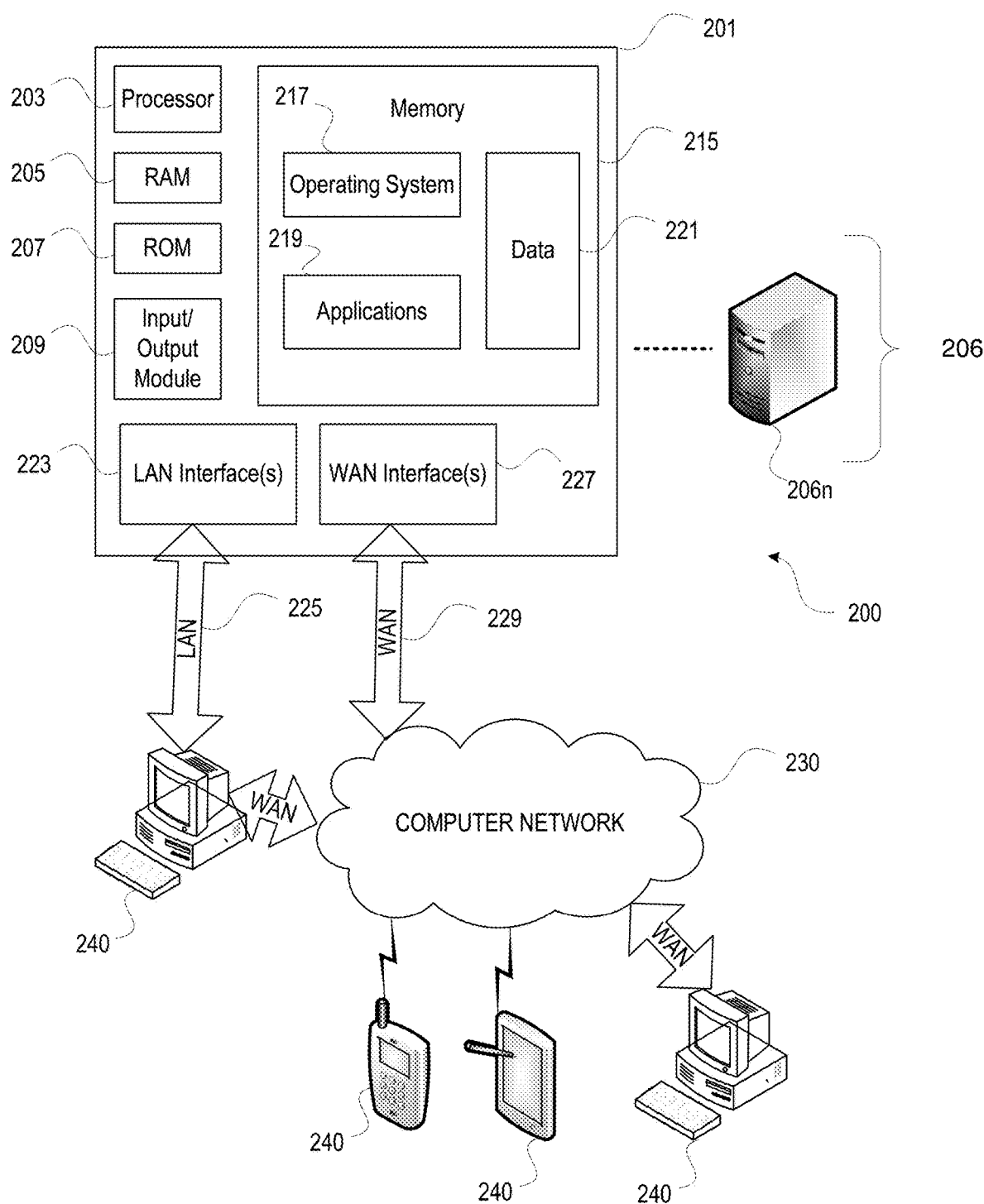
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
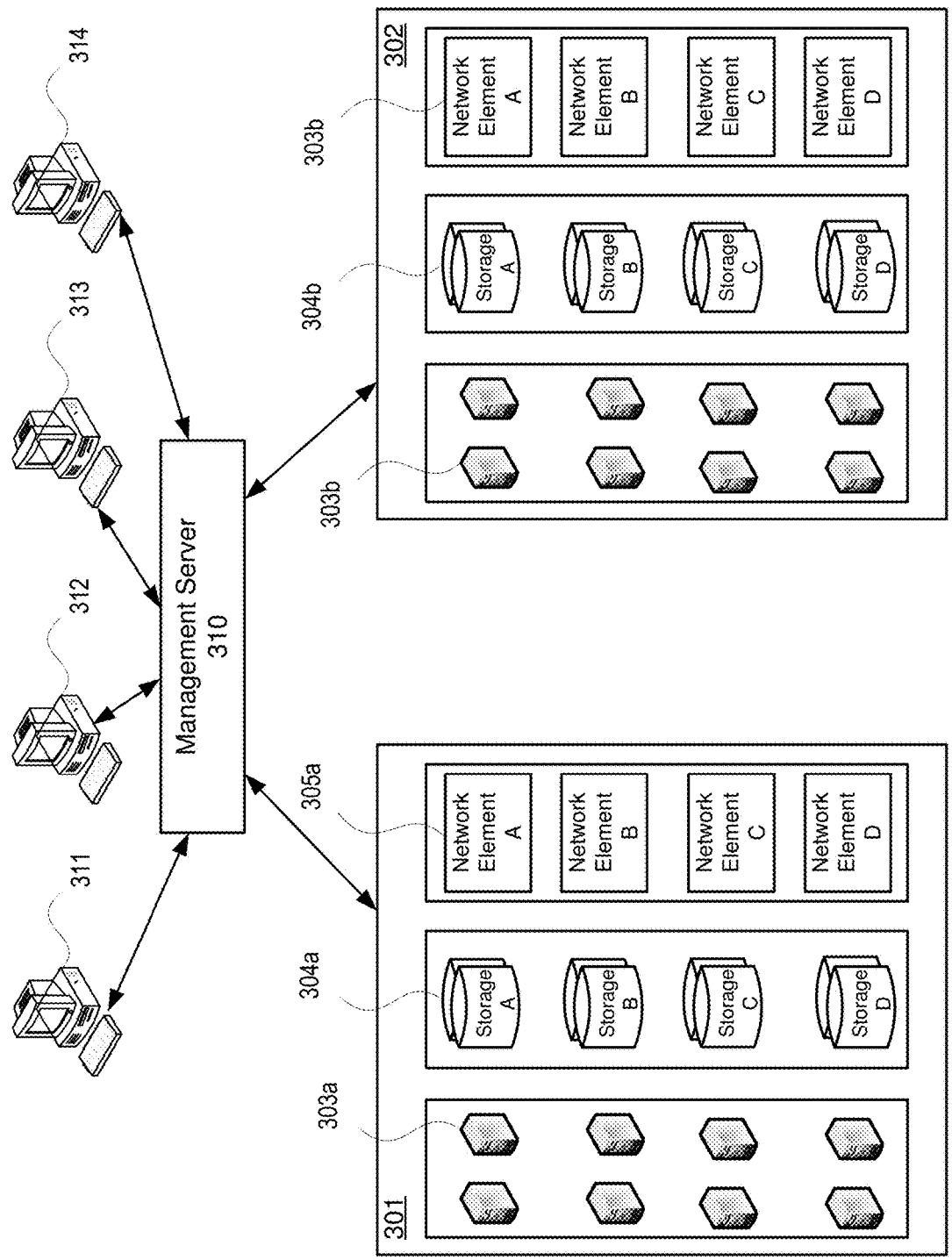
FIG. 3 depicts an illustrative cloud-based system architecture that may be used in accordance with one or more illustrative aspects described herein.

With further reference to FIG. 3, some aspects described herein may be implemented in a cloud-based environment. FIG. 3 illustrates an example of a cloud computing environment (or cloud system) 300. As seen in FIG. 3, client computers 311-314 may communicate with a cloud management server 310 to access the computing resources (e.g., host servers 303a-303b (generally referred herein as "host servers 303"), storage resources 304a-304b (generally referred herein as "storage resources 304"), and network resources 305a-305b (generally referred herein as "network resources 305")) of the cloud system.

Management server 310 may be implemented on one or more physical servers. The management server 310 may run, for example, CLOUDPLATFORM by Citrix Systems, Inc. of Ft. Lauderdale, Fla., or OPENSTACK, among others. Management server 310 may manage various computing resources, including cloud hardware and software resources, for example, host computers 303, data storage devices 304, and networking devices 305. The cloud hardware and software resources may include private and/or public components. For example, a cloud may be configured as a private cloud to be used by one or more particular customers or client computers 311-314 and/or over a private network. In other embodiments, public clouds or hybrid public-private clouds may be used by other customers over an open or hybrid networks.

Management server 310 may be configured to provide user interfaces through which cloud operators and cloud customers may interact with the cloud system 300. For example, the management server 310 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 310 also may include a set of APIs and/or one or more customer console applications with user interfaces configured to receive cloud computing requests from end users via client computers 311-314, for example, requests to create, modify, or destroy virtual machines within the cloud. Client computers 311-314 may connect to management server 310 via the Internet or some other communication network, and may request access to one or more of the computing resources managed by management server 310. In response to client requests, the management server 310 may include a resource manager configured to select and provision physical resources in the hardware layer of the cloud system based on the client requests. For example, the management server 310 and additional components of the cloud system may be configured to provision, create, and manage virtual machines and their operating environments (e.g., hypervisors, storage resources, services offered by the network elements, etc.) for customers at client computers 311-314, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 311-314 may be related, for example, different client computers creating virtual machines on behalf of the same end user, or different users affiliated with the same company or organization. In other examples, certain clients 311-314 may be unrelated, such as users affiliated with different companies or organizations. For unrelated clients, information on the virtual machines or storage of any one user may be hidden from other users.

Referring now to the physical hardware layer of a cloud computing environment, availability zones 301-302 (or zones) may refer to a collocated set of physical computing resources. Zones may be geographically separated from other zones in the overall cloud of computing resources. For example, zone 301 may be a first cloud datacenter located in California, and zone 302 may be a second cloud datacenter located in Florida. Management server 310 may be located at one of the availability zones, or at a separate location. Each zone may include an internal network that interfaces with devices that are outside of the zone, such as the management server 310, through a gateway. End users of the cloud (e.g., clients 311-314) might or might not be aware of the distinctions between zones. For example, an end user may request the creation of a virtual machine having a specified amount of memory, processing power, and network capabilities. The management server 310 may respond to the user's request and may allocate the resources to create the virtual machine without the user knowing whether the virtual machine was created using resources from zone 301 or zone 302. In other examples, the cloud system may allow end users to request that virtual machines (or other cloud resources) are allocated in a specific zone or on specific resources 303-305 within a zone.

In this example, each zone 301-302 may include an arrangement of various physical hardware components (or computing resources) 303-305, for example, physical hosting resources (or processing resources), physical network resources, physical storage resources, switches, and additional hardware resources that may be used to provide cloud computing services to customers. The physical hosting resources in a cloud zone 301-302 may include one or more computer servers 303, such as the virtualization servers 301 described above, which may be configured to create and host virtual machine instances. The physical network resources in a cloud zone 301 or 302 may include one or more network elements 305 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 301-302 may include storage disks (e.g., solid state drives (SSDs), magnetic hard disks, etc.) and other storage devices.

The example cloud computing environment shown in FIG. 3 also may include a virtualization layer with additional hardware and/or software resources configured to create and manage virtual machines and provide other services to customers using the physical resources in the cloud. The virtualization layer may include hypervisors, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 303 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Adaptive Data Sanitation

Figure 4:
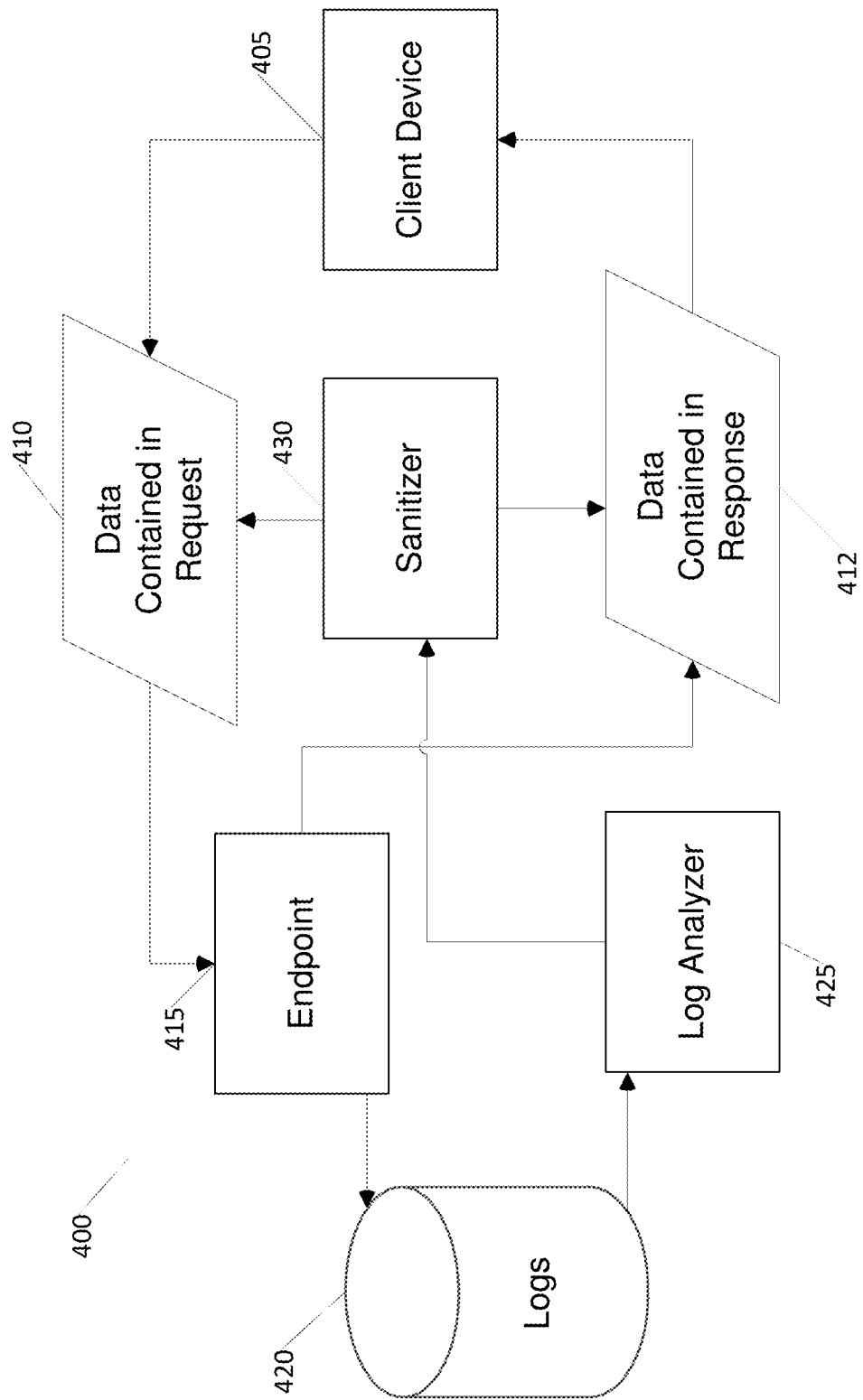
FIG. 4 is a diagram of an adaptive data sanitation system according to one or more illustrative aspects of the disclosure.

FIG. 4 is a diagram of an adaptive data sanitation system according to one or more illustrative aspects of the disclosure. Client device 405 may make a request for data to an endpoint 415. Communications within this disclosure, including requests and responses may follow the Hypertext Transfer Protocol (HTTP). The request to the endpoint 415 may comprise request data 410 that requires sanitation. The endpoint 415 may comprise a REST API system. Although only one endpoint 415 is shown, the system may comprise any number of endpoints. The data 410 may be sanitized by sanitizer 430 before it is received by the endpoint 415. When sanitizing, the sanitizer 430 may receive a sanitation level from the logger analyzer 425. The sanitation level may indicate how extensively the request data 410 should be sanitized. The log analyzer 425 may determine a level of sanitation based on the logs 420. The logs 420 may contain every operation performed by any component within the system 400, including the endpoint 415. After receiving sanitized request data, the endpoint may send a response back to the client device 405. The sanitizer 430 may sanitize the response data 412 according to the sanitation level received previously from the log analyzer 425. Alternatively, the sanitizer 430 may receive an additional sanitation level, from the log analyzer 425, corresponding to the response data 412. The client device 405 may then receive the sanitized response data 412.

The request data 410 and the response data 412 may comprise one or more data fields. An endpoint may comprise data objects that store request data 410 received from a client device 405. The data objects may also store response data 412 before it is sent to the client device 405. The data objects may comprise individual data fields that may be tagged with an attribute indicating that a data field should be sanitized. The sanitizer 430 may perform a onetime inspection of the data objects to determine which data fields need to be sanitized and the sanitizer 430 may store the data fields requiring sanitation in a metadata model. A metadata model may be created for each endpoint, allowing the sanitizer to know which data fields need to be sanitized for each endpoint.

The sanitizer 430 may provide a centralized solution for data sanitation. Any request from a client device may be sanitized by the sanitizer regardless of which endpoint the request is associated with. When a data field is tagged for sanitation, the sanitizer 430 may sanitize the data field for every endpoint that has a data field that corresponds to the marked data field. Thus, in one location, an administrator may specify data fields to be sanitized for all endpoints instead of specifying data fields at each endpoint individually. For example, a user may desire that the "name" data field be sanitized in all requests to all endpoints. The user may specify that the name field be sanitized at the sanitizer 430, and thereafter the name data field will be sanitized for all endpoints that receive a request containing the "name" data field.

Figure 5:
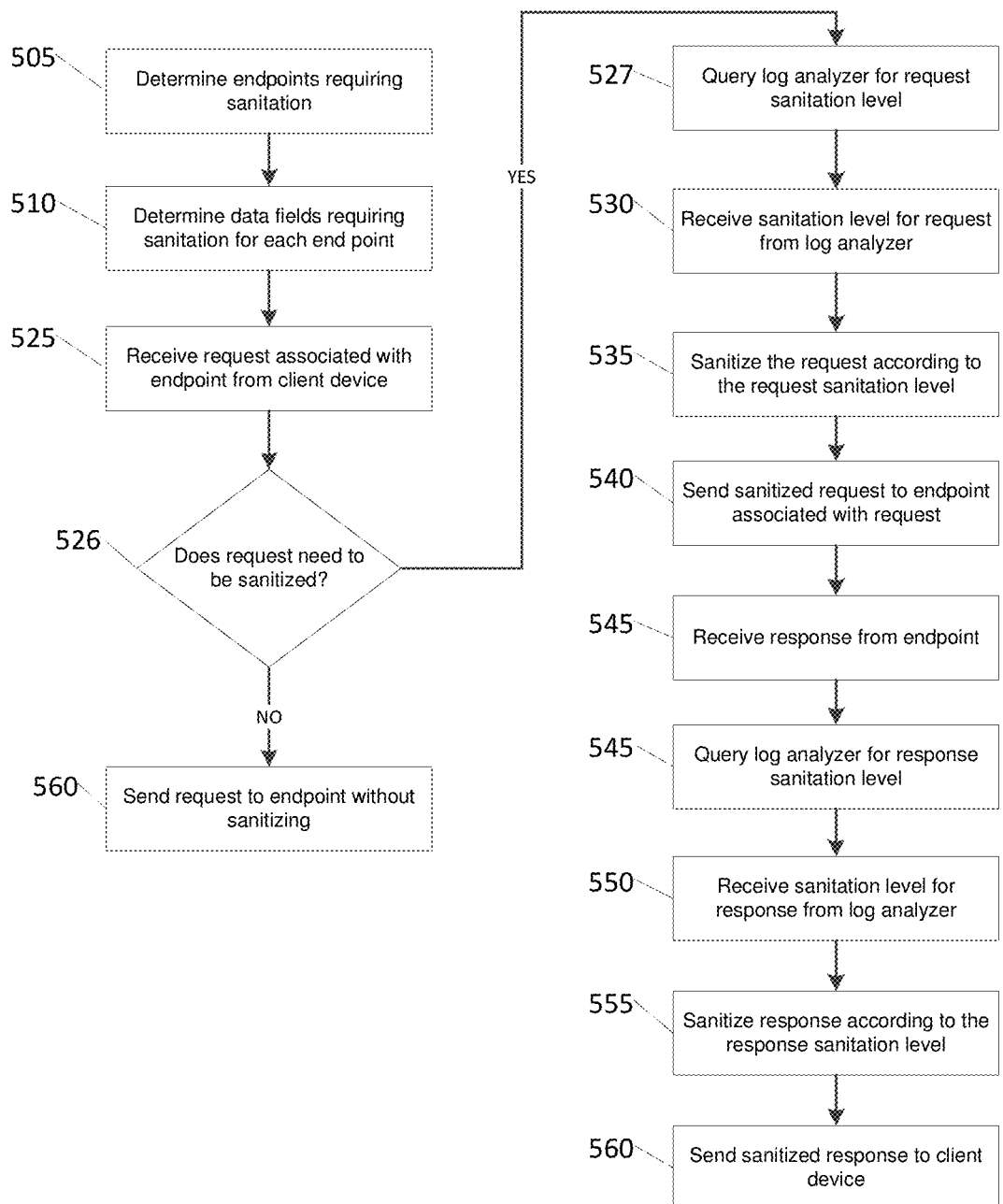
FIG. 5 is a flow diagram of a method for adaptive data sanitation according to one or more illustrative aspects of the disclosure.

FIG. 5 is a flow diagram of a method for adaptive data sanitation according to one or more illustrative aspects of the disclosure. In one or more embodiments, one or more steps illustrated in FIG. 5 may be performed by one or more computing devices or entities. For example, portions of the steps illustrated in FIG. 5 may be performed by one or more computing devices, such as data server 103, web server 105, client computer 107, client computer 109, or by one or more elements of FIGS. 2-3. The steps illustrated in FIG. 5 may be embodied in computer-executable instructions that are stored in a computer-readable medium, such as a non-transitory computer readable medium. The steps illustrated in FIG. 5 need not all be performed in the order specified, and some steps may be omitted or changed in order.

At step 505, endpoints that require assistance with data sanitation may be determined. The endpoints may be determined manually. Alternatively, all endpoints within a system may be selected for sanitation.

At step 510, the data fields at each endpoint that require sanitation may be determined. The data fields may be chosen manually. Each endpoint may have different data fields that require sanitation. A metadata model may be created for each endpoint. The metadata model may store the data fields that require sanitation for a particular endpoint.

At step 525, a request associated with an endpoint may be received by the sanitizer. The request may have been made by a client device. At step 526, whether the request needs to be sanitized or not may be determined. If the request is associated with an endpoint that does not require sanitation, then the request may be sent to its corresponding endpoint without sanitation in step 560.

At step 527, a log analyzer may be queried to obtain a sanitation level for the request and its corresponding endpoint. The sanitation level may comprise information indicating how vulnerable to attacks the endpoint corresponding to the request is. The log analyzer may analyze a database containing all logs in the system. The logs may keep track of every operation performed by the system. Recorded operations may include adding a user, deleting a user, modifying a user, data requests, data transfers, etc. The logs may include any request received (with the request's associated data) or response given (with the response's associated data) by the system. Each endpoint may have an associated log that records every request and response corresponding to the endpoint or any other operation performed by the endpoint.

The log analyzer may analyze the logs and may provide information to the sanitizer indicating how vulnerable an endpoint is to an attack. The log analyzer may determine a sanitation level for the request. The sanitation level may be based on previous operations of the endpoint. For example, the log analyzer may determine that in one or more requests to an endpoint, the data field for "last name" contained the Structured Query Language (SQL) statement "select * from." In this example, the log analyzer may then determine a sanitation level that is adequate for sanitizing data fields that contain SQL statements. The log analyzer may determine a sanitation level based on whether a proportion of requests containing malicious data rises above a predetermined threshold. The sanitation level may be determined based on the type of request made by the client device. The sanitation level may also be determined based on an importance level associated with the endpoint. The importance level may indicate to what degree the operability of the endpoint is necessary for other services in a system. The sanitation level may also be determined based on the sensitivity of the data that the endpoint interacts with. The log analyzer may also determine the sanitation level based on an exposure level associated with the endpoint.

The sanitation level for an endpoint, as determined by the log analyzer, may change over time. The log analyzer may determine that a frequency of attacks is increasing over time at an endpoint and may raise the sanitation level for the endpoint. The log analyzer may also determine that a frequency of attacks is decreasing over time at a particular endpoint and may lower the sanitation level for the endpoint. The sanitation level may also change as the sensitivity of the data provided at an endpoint changes.

At step 530, the sanitizer may receive a sanitation level for the request from the log analyzer. At step 535, the sanitizer may sanitize the request according to the request sanitation level. The sanitation level may indicate to the sanitizer what actions should be performed during sanitation. The sanitation level may indicate that the sanitizer should remove any type of malicious or otherwise undesirable code or data from a request. The sanitation level may also indicate how thoroughly the sanitation should be performed. For example, a first sanitation level may indicate that the sanitizer should check data fields for invalid or special characters and remove the invalid or special characters. A second sanitation level may indicate that the sanitizer should search for, and remove JavaScript statements in addition to invalid characters. A third sanitation level may indicate that the sanitizer should search for, and remove SQL statements, JavaScript statements, and invalid characters. Other sanitation levels may indicate that Hypertext Markup Language (HTML) encodings should be searched for and removed. Higher levels of sanitation may indicate that more processing resources are required to complete the sanitation while lower levels of sanitation may indicate that less processing resources are required to complete the sanitation.

Every data field in the request may be sanitized or a subset of the data fields in the request may be sanitized. The data fields that are sanitized may be determined based on a metadata model that corresponds to an endpoint. The metadata model may indicate which data fields require sanitation as explained above.

At step 540, the sanitizer may send the sanitized request to the request's corresponding endpoint. At step 545, the sanitizer may receive the endpoint's response to the request. The response may comprise data requiring sanitation.

At step 547, the sanitizer may query the log analyzer for a response sanitation level. The log analyzer may determine a sanitation level for the response by analyzing logs in a similar manner as described above for a request. Although described separately, the sanitizer may query the log analyzer for both the request sanitation level and the response sanitation level in one query.

At step 555, the sanitizer may sanitize the response according to the response sanitation level. The sanitation of the response may be performed in the same manner that the sanitation of the request is performed. At step 560, the sanitized response may be sent to the corresponding client device that made the request.

Figure 6:
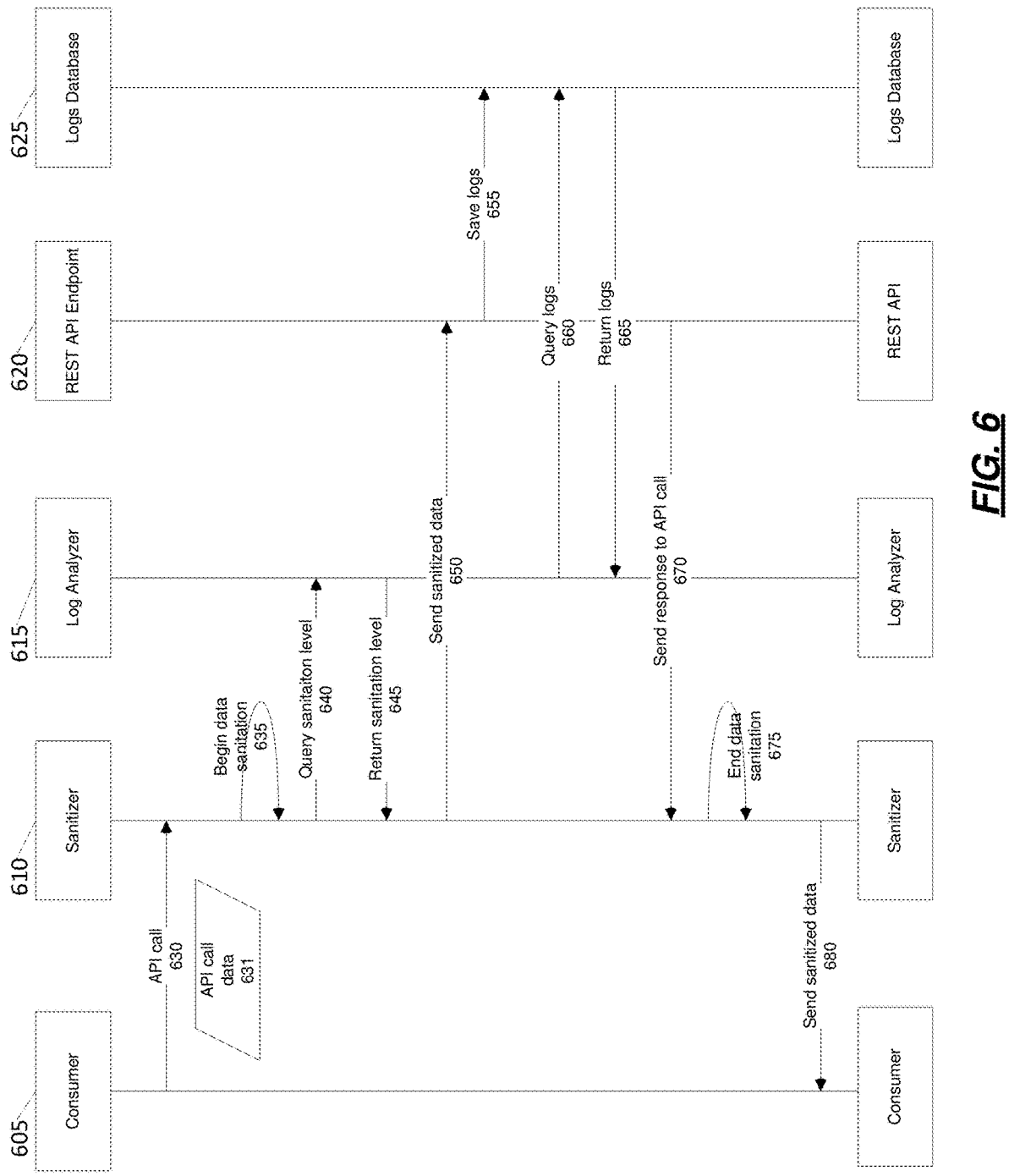
FIG. 6 is a flow diagram of an additional method for adaptive data sanitation according to one or more illustrative aspects of the disclosure.

FIG. 6 is a flow diagram of a method for adaptive data sanitation according to one or more illustrative aspects of the disclosure. In one or more embodiments, one or more steps illustrated in FIG. 6 may be performed by one or more computing devices or entities. For example, portions of the steps illustrated in FIG. 6 may be performed by one or more computing devices, such as data server 103, web server 105, client computer 107, client computer 109, or by one or more elements of FIGS. 2-3. The steps illustrated in FIG. 6 may be embodied in computer-executable instructions that are stored in a computer-readable medium, such as a non-transitory computer readable medium. The steps illustrated in FIG. 6 need not all be performed in the order specified, and some steps may be omitted or changed in order.

At step 630, a consumer (or client, etc.) 605, may make an API call that is received by sanitizer 610. The API call 630 may contain API call data 631. After receiving the API call, the sanitizer may begin data sanitation at step 635. The sanitizer may query the log analyzer 615 for a sanitation level at step 640. At step 645, the log analyzer may return the sanitation level to the sanitizer.

At step 610, the sanitizer may send the sanitized data 650 to the REST API endpoint 620 for further processing. At step 655, the REST API endpoint may save operations it has performed into the logs database 625. The operations performed by the REST API endpoint 620 may indicate whether the endpoint has been subjected to a cyber attack. The log analyzer 615 may query the logs database at step 660 for the logs pertaining to REST API endpoint 620. The log analyzer may receive the queried logs at step 665. The log analyzer may analyze the received logs and update the sanitation level for REST API endpoint 620 based on the results of its analysis as described above.

At step 670 the REST API endpoint 620 may send, to the sanitizer 610, the response to the API call. At step 675, the sanitizer may end data sanitation and in step 680, the sanitizer may send sanitized data to the consumer 605.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a computing device and from a client device, a request associated with an endpoint, wherein the request comprises request data;
   receiving, by the computing device and based on a query sent to a log analyzer, a sanitation level corresponding to the request data, wherein the sanitation level is determined based at least in part on previous requests received by the endpoint, responses given by the endpoint, and an importance level that indicates to what degree operability of the endpoint is necessary for other services;
   creating, by the computing device, sanitized request data by sanitizing the request data in the request based on the sanitation level;
   sending, by the computing device, the sanitized request data to the endpoint;
   receiving, by the computing device and from the endpoint, response data corresponding to the sanitized request data; and
   sending, by the computing device and to the client device, the response data.

2. The method of claim 1, wherein the request is a RESTful service request associated with a RESTful service endpoint.

3. The method of claim 1, wherein the sanitation level received indicates that invalid characters should be searched for and removed from the request data.

4. The method of claim 3, wherein the sanitation level received further indicates that programming code should be searched for and removed from the request data.

5. The method of claim 1, further comprising:
   receiving, by the computing device and from the log analyzer, a response sanitation level corresponding to the response data;
   creating, by the computing device, sanitized response data by sanitizing the response data according to the response sanitation level; and
   sending, by the computing device and to the client device, the sanitized response data.

6. The method of claim 1, wherein the sanitation level corresponds to a time complexity to complete sanitation.

7. The method of claim 1, further comprising:
   receiving a metadata model indicating request data fields to be sanitized; and
   wherein the sanitizing the request data based on the sanitation level is further based on the metadata model.

8. A computing device comprising:
   a processor; and
   memory storing instructions that, when executed by the processor, configure the computing device to:
      receive, from a client device, a request associated with an endpoint, wherein the request comprises request data;
      receive, from a log analyzer, a sanitation level corresponding to the request data, wherein the sanitation level is determined based at least in part on responses given by the endpoint, and a determination that a proportion, corresponding to an amount of previous requests that contained malicious data, exceeds a threshold;
      create sanitized request data by sanitizing the request data based on the sanitation level;
      send the sanitized request data to the endpoint;
      receive, from the endpoint, response data corresponding to the sanitized request data; and
      send, to the client device, the response data.

9. The computing device of claim 8, wherein the request is a RESTful service request associated with a RESTful service endpoint.

10. The computing device of claim 8, wherein the sanitation level received indicates that invalid characters should be searched for and removed from the request data.

11. The computing device of claim 8, wherein the sanitation level received further indicates that programming code should be searched for and removed from the request data.

12. The computing device of claim 8, wherein the memory storing instructions that, when executed by the processor, further configure the computing device to:
   receive, from the log analyzer, a response sanitation level corresponding to the response data;
   create sanitized response data by sanitizing the response data according to the response sanitation level; and
   send, to the client device, the sanitized response data.

13. The computing device of claim 8, wherein the sanitation level corresponds to an amount of processing time to complete sanitation.

14. The computing device of claim 8, wherein the memory storing instructions that, when executed by the processor, further configure the computing device to:
   receive a metadata model indicating request data fields to be sanitized; and
   wherein the sanitizing the request data according to the sanitation level is further based on the metadata model.

15. One or more non-transitory computer-readable media storing computer-readable instructions that, when executed by at least one processor, cause a computing platform to:
   receive, from a client device, a request associated with an endpoint, wherein the request comprises request data;
   receive, from a log analyzer, a sanitation level corresponding to the request data, wherein the sanitation level is adjusted based at least in part on previous requests received by the endpoint, responses given by the endpoint, and an importance level that indicates to what degree operability of the endpoint is necessary for other services;
   create sanitized request data by sanitizing the request data based on the sanitation level;
   send the sanitized request data to the endpoint;
   receive, from the endpoint, response data corresponding to the sanitized request data; and
   send, to the client device, the response data.

16. The computer-readable media of claim 15, wherein the sanitation level is adjusted to be higher than a previous sanitation level based on a determination that a frequency of attacks has increased.

17. The computer-readable media of claim 15, wherein the computer-readable instructions, when executed by the at least one processor, further cause the computing platform to:
   receive, from the log analyzer, a response sanitation level corresponding to the response data;
   create sanitized response data by sanitizing the response data according to the response sanitation level; and
   send, to the client device, the sanitized response data.

18. The computer-readable media of claim 15, wherein the sanitation level received indicates that special characters should be searched for and removed from the request data.

19. The computer-readable media of claim 15, wherein the sanitation level is further determined based at least in part on a determination that a proportion of previous requests contained malicious data and based at least in part on a determination that the proportion exceeds a threshold.

20. The method of claim 1, wherein the sanitation level is further adjusted based at least in part on a determination that a proportion of previous requests contained malicious data and based at least in part on a determination that the proportion exceeds a threshold.

21. A method comprising:
receiving, from a client device, a request associated with an endpoint, wherein the request comprises request data;
receiving, from a log analyzer, a sanitation level corresponding to the request data, wherein the sanitation level is determined based at least in part on responses given by the endpoint, and a determination that a proportion, corresponding to an amount of previous requests that contained malicious data, exceeds a threshold;
creating sanitized request data by sanitizing the request data based on the sanitation level;
sending the sanitized request data to the endpoint;
receiving, from the endpoint, response data corresponding to the sanitized request data; and
sending, to the client device, the response data.

22. The method of claim 21, wherein the request is a RESTful service request associated with a RESTful service endpoint.

23. The method of claim 21, wherein the sanitation level received indicates that invalid characters should be searched for and removed from the request data.

24. The method of claim 21, wherein the sanitation level received further indicates that programming code should be searched for and removed from the request data.

25. The method of claim 21, further comprising:
receiving, from the log analyzer, a response sanitation level corresponding to the response data;
creating sanitized response data by sanitizing the response data according to the response sanitation level; and
sending, to the client device, the sanitized response data.

26. The method of claim 21, wherein the sanitation level corresponds to an amount of processing time to complete sanitation.

27. The method of claim 21, further comprising:
receiving a metadata model indicating request data fields to be sanitized; and
wherein the sanitizing the request data according to the sanitation level is further based on the metadata model.

* * * * *